United States Patent [19]

Martinez

[11] 4,239,259
[45] Dec. 16, 1980

[54] HEIGHT ADJUSTABLE INFANT STROLLER-HIGH CHAIR

[76] Inventor: Virginia R. Martinez, Apt. H-11, 451 Casselman St., Chula Vista, Calif. 92010

[21] Appl. No.: 27,608

[22] Filed: Apr. 6, 1979

[51] Int. Cl.³ .............................................. B62B 7/08
[52] U.S. Cl. .................................... 280/649; 280/650
[58] Field of Search .............. 280/649, 648, 650, 658, 280/642, 643

[56] References Cited

U.S. PATENT DOCUMENTS

| | | | |
|---|---|---|---|
| 2,715,936 | 8/1955 | Galloway | 280/643 |
| 2,798,730 | 7/1957 | Smith | 280/649 |
| 2,805,076 | 9/1957 | Thomas | 280/643 |
| 2,976,912 | 3/1961 | Dias | 280/658 |
| 3,109,666 | 11/1963 | Wilson | 280/648 |
| 3,248,125 | 4/1966 | Gill | 280/643 |
| 3,330,575 | 7/1967 | Boudreau | 280/649 |
| 3,411,799 | 11/1968 | Felsher | 280/649 |

*Primary Examiner*—David M. Mitchell
*Attorney, Agent, or Firm*—Frank D. Gilliam

[57] ABSTRACT

A height adjustable infant stroller and high chair combination comprising a seat member, seat member supporting structure and seat member leveling structure. The seat member is vertically positionable along the seat member supporting structure at selected elevations while maintaining the supporting portion of the seat member substantially parallel with the supporting surface of the device. Locking devices are utilized to prevent undesired seat member elevation and support surface movement.

8 Claims, 5 Drawing Figures

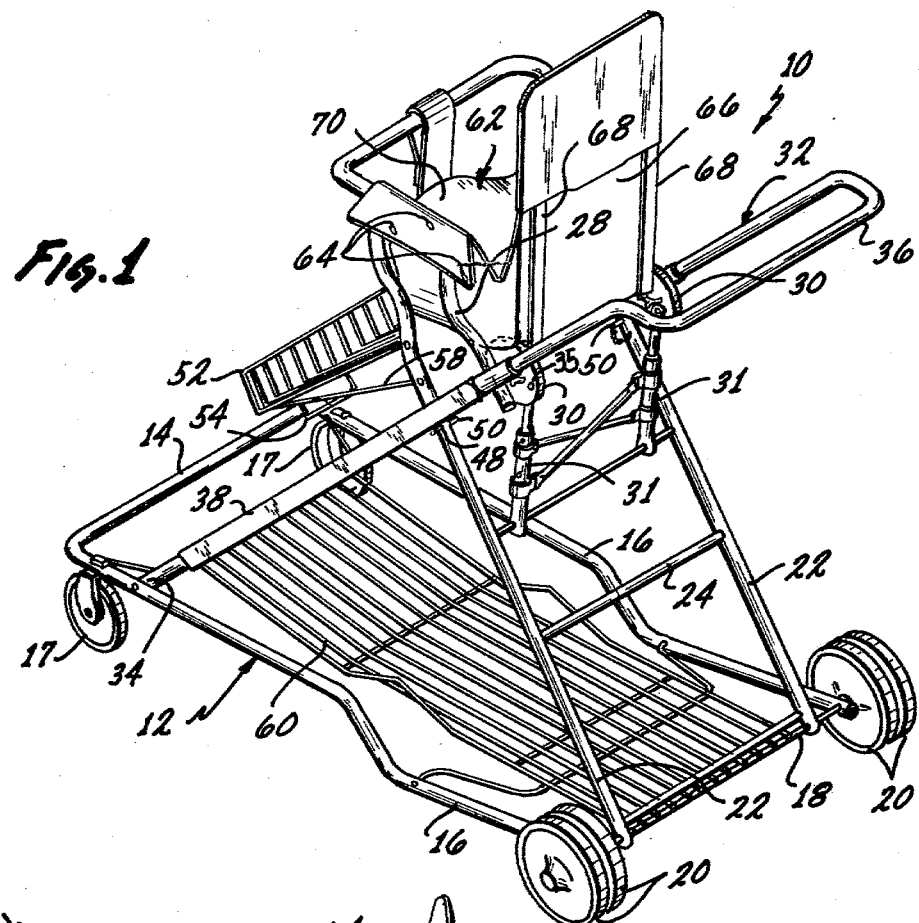
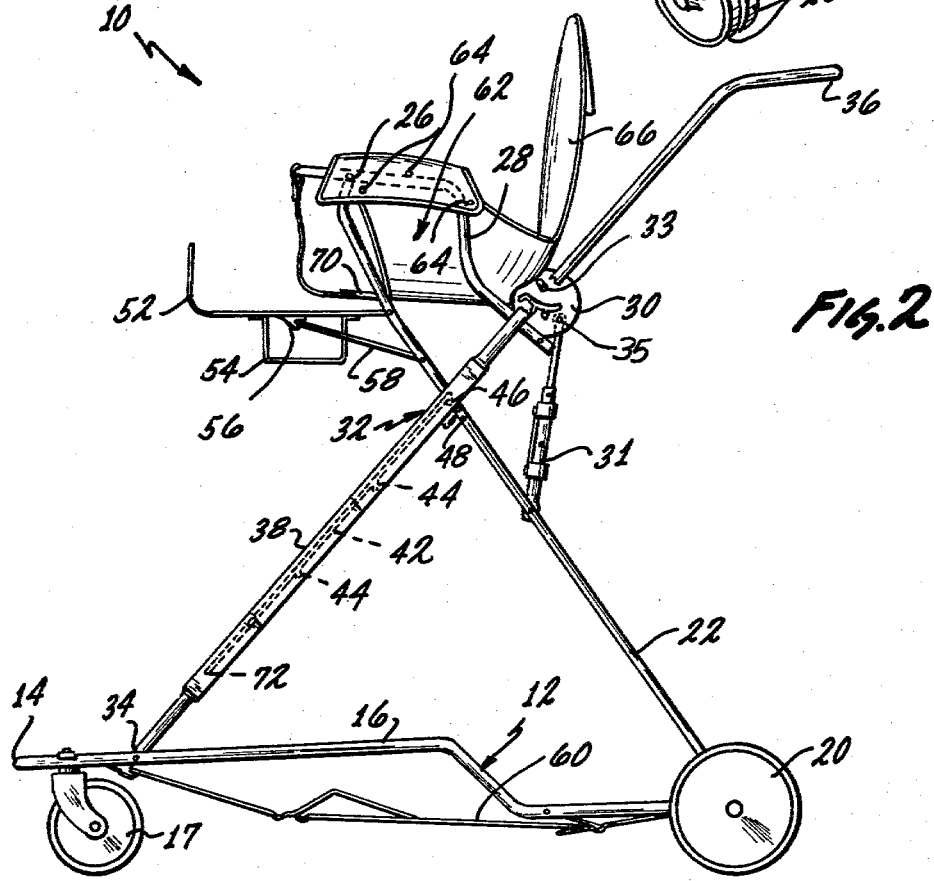

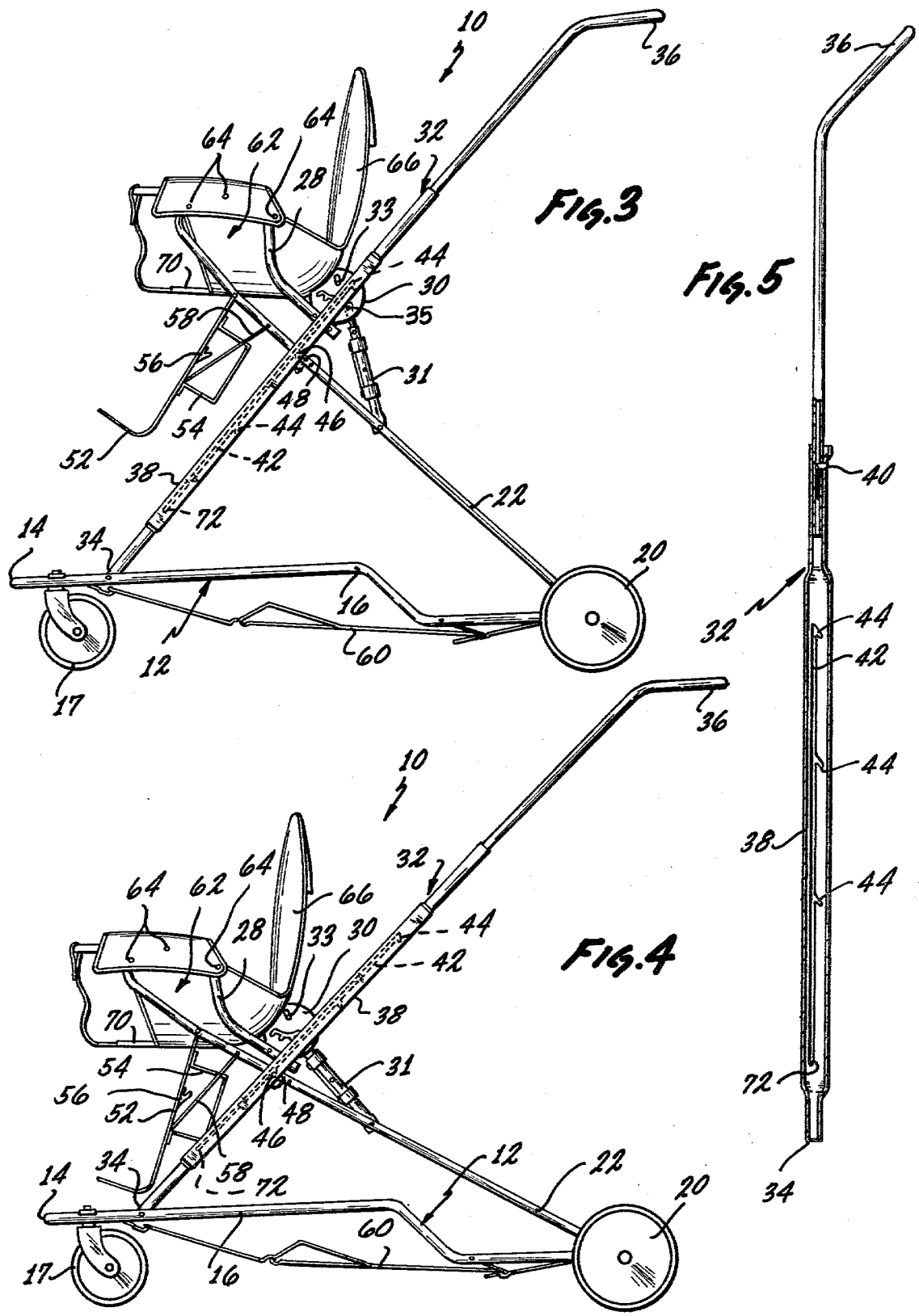

4,239,259

HEIGHT ADJUSTABLE INFANT STROLLER-HIGH CHAIR

BACKGROUND OF THE INVENTION

The invention relates generally to combination infant strollers and high chairs and more specifically a device of this type that are vertically adjustable for selectively changing the seat elevation while maintaining the vision of the infant substantially perpendicular with the device's supporting surface.

Many different forms of infant chairs and strollers have been in existence for many decades. Although these various prior devices have achieved varying degrees of success, they all have a common disadvantage for the infant user. The infant seat is not vertically adjustable to an elevation where the infant is at eye level with a standing or seated parent or adult. The child must either continue to strain his neck to look up or the parent or attendant is forever bending down to satisfy the needs of the infant. Another rather apparent deficiency with these prior art devices is the lack of support provided for the legs and feet of the infant. Generally, the infant's legs and feet dangle from the seat or a fixed support is provided that does not take in account the size of the infant or the position of the infant in the seat. Most, if not all, strollers now in use position the child so low to the supporting surface that noxious fumes from vehicles are continuously inhaled by the infant or the infant is undesirably bothered by animals.

Obviously it would be advantageous from both the infant's and parent or attendant's standpoint to provide a stroller-high chair where the infant can be positioned at an elevated level and the legs and feet can be continuously supported.

These and various other problems with existing apparatus of this type have not been overcome until the emergence of the instant invention.

SUMMARY OF THE INVENTION

The aforementioned inadequacies of the prior art devices have been overcome by providing a new, novel and useful combination infant stroller and high chair which can be safely adjustable for elevating the height of the infant seated therein to a selected level, maintaining the infant at a proper viewing perspective and locking the device at the selected elevation until change of elevation is desired. The details of the invention will be readily understood when the accompanying specifications are read in view of the following drawing figures.

BRIEF DESCRIPTION OF THE DRAWINGS

FIG. 1 is a perspective view of the preferred embodiment of the instant invention with the infant seat positioned in a maximum elevation.

FIG. 2 is a side view of the showing of FIG. 1 with the leg and feet support platform elevated.

FIG. 3 is a view similar with FIG. 2 with the infant seat positioned in an intermediate position.

FIG. 4 is a view similar to FIGS. 2 and 3 with the infant seat positioned in the lowest seat elevation position.

FIG. 5 is an enlarged cutaway showing of the frame and telescoping handle member.

THE PREFERRED EMBODIMENT OF THE INVENTION

The same reference numerals are used throughout the figures and specifications to denote the same or similar element or part.

FIG. 1 is a perspective showing of the preferred embodiment of the invention. There is shown a combination infant stroller and high chair 10. The stroller-high chair is supported above its support surface by a generally "U" shaped frame 12. The frame 12 is shown including a front cross-bar or bumper 14 and longitudinal side members 16. At the forward end of the side members and adjacent cross-bar 14, there are pivotly attached two front wheels 17 with a caster type attachment. Positioned across the open end or rear of the frame 12 is a transverse axle 18 carrying two pair of rear support wheels 20 thereon. It should be understood although a pair of dual wheels is shown, a pair of single wheels 20 of sufficient strength and spaced apart relationship could be substituted to successfully practice this invention.

Pivotly attached to axle 18 are a pair of frame members 22 which extend toward the front of the device. A pair of cross-bars 24 are fixedly secured to the frame members 22 to increase the overall strength of the device.

At the upper end of the frame member 22, a pivotal attachment 26 (see FIG. 2) is made with the seat frame 28. The lower end of seat frame 28 is also pivotly attached through seat back positioning disks 30 and telescoping links 31 to frame member 22. The attachments of the seat frame 28, the back positioner adjustment pivot 33, the telescoping link 31 and attachment 35 are positioned out from the center of the back positioning disk 30.

Extending from the front of frame 12 toward the back in an upward direction is a second frame 32. This frame 32 is pivotally attached to side members 16 at pivot point 34. The opposite end of this frame 32 provides a handle 36 for pushing and/or controlling movement of the stroller-high chair. This handle 36 may be an integral portion of the frame 32 or may be a "U" member that can be telescoped into the sides 38 for changing the operating length or position of the handle or for nesting the handle as for storage (see FIG. 5). A lock 40 of the spring biased pin type is used to lock the handle into operating position. Intermediate the side member 16 and the handle along each side member 38 is a longitudinal slot 42. Along this slot 42 are selectively positioned slot extensions 44. Frame members 22 are each provided with fixedly positioned pivot pins 46 which slidely engage and are confined to slot 42 and may be selectively located within a slot 42 extension 44. Each frame member 22 has an aperture 48 therethrough for receiving a keeper pin 50. This keeper pin 50 secures the pivot pin 46 in its selected slot extension 44 until manually moved therefrom.

An infant leg and feet platform 52 is pivotly attached between the frame members 22 and extends outwardly in the direction of the front of the device. On each outer lower surface of this platform 52 is fixedly secured a substantially rectangular shaped platform positioning bracket 54. Intermediate the forward and rearward surfaces of this bracket 54 is a rearward extending protrusion 56. Also extending from a pivotal attachment to frame member 22 is a platform lock member 58. This lock member 58 working in combination with protrusion 56 provides two separate positions for the outer end of the platform 52 (see FIGS. 2, 3 and 4 for clarity).

The inner open area of the frame 12 is provided with a shelf 60 for carrying various infant's needs, as well as occasional purchases.

The seat frame 28 typically supports a seat 62 which may be constructed of any materials suitable for this purpose and may be removable by snaps 64 and slipped as an open envelope in the back for slipping over the seat frame upright 68 which is positionable.

FIG. 2 shows the pivot 46 at a position lower than that of FIG. 1 and further shows the platform 52 parallel with the wheel supporting surface, while FIGS. 1, 3 and 4 show the platform angled from the wheel supporting surface.

FIGS. 3 and 4 show still lower positions of the pivot 46 and consequently causing a lower seat elevation.

The telescoping links 31 take various different lengths to provide leveling of the infant support portion 70 of the seat through various different seat elevations.

OPERATION OF THE PREFERRED EMBODIMENT

When the device is stored and not in use a minimum overall dimension is generally desired. To accomplish this, the seat back 68 is folded forward into seat area 70, the pivot pins 46 are located at end 72 of slot 42, the handle 36 (if telescopable) is collapsed into side members 40, telescoping links 31 are collapsed to their minimum length and the platform 52 is in the FIG. 2 position.

When the device is again put to use the aforementioned operations will be reversed to a desired degree. Pivot pins 48 will be located in a desired slot extension 46 and the pin 50 will be inserted in apertures 48. The telescoping links 32 will be extended for proper positioning of the infant support portion of the seat. The back 68 of the seat will be repositioned for infant use. The handle 36 is extended (if telescoped). The device is now ready for use.

The embodiment as drawn and described represents only one embodiment of the invention.

Various modifications may be made thereto by an expert of the art, without leaving the scope of the invention idea.

What is claimed is:

1. An improved height adjustable infant stroller-high chair apparatus comprising in combination:
   a seat member
   supporting means for positioning said seat member at a selected elevation for positioning said seat member through a plurality of different selected vertical elevations; and leveling means positioned between said seat member and said supporting means selectively adjustable for maintaining the infant supporting surface of said seat member substantially parallel with said infant supporting surface at each of said plurality of different selected vertical elevations,
   said supporting means comprises, a pair of first and second diagonally disposed and pivotally attached frame members, a pair of frame support members each having a pivotal attachment to each pair of said frame members, a plurality of slots located along the inner surface of each of the first frame members for selectively positioning the pivotal connection between said first and second frame members, a seat member support bracket, said seat member support bracket having a first pivotal attachment to one end of each of the second frame members and a second pivotal attachment to said seat leveling means and a pair of telescoping members each pivotly connected between said seat leveling means and one of said second frame members.

2. The invention as defined in claim 1, wherein said supporting means further comprises a platform member pivotly attached thereto for supporting the legs and feet of said infant seated in said seat member, said supporting platform being pivotable between a first position wherein said supporting platform is substantially parallel with said infant supporting surface and a second position wherein said supporting platform forms an angle with said infant supporting surface.

3. The invention as defined in claim 2, wherein holding means is provided for supporting and locking said platform member in its selected first or second position.

4. The invention as defined in claim 1, wherein the first frame member includes a handle member opposite its frame support member connected end.

5. The invention as defined in claim 4, wherein said handle portion of said first frame member telescopes within the sides of said first frame member to vary the effective length of said first frame member.

6. The invention as defined in claim 1, wherein locking means are provided for locking the pivotal connection at a selected slot along said first frame member.

7. The invention as defined in claim 1, wherein said telescoping member is selectively length adjustable between the second frame member pivotal attachment point and its seat leveling means connection.

8. The invention as defined in claim 7, wherein locking means is provided on said telescoping means for locking the telescoping member at a selected length.

* * * * *